(12) United States Patent
Olteanu et al.

(10) Patent No.: US 9,613,054 B2
(45) Date of Patent: Apr. 4, 2017

(54) IDENTIFYING DESCRIPTIVE TERMS ASSOCIATED WITH A PHYSICAL LOCATION FROM A LOCATION STORE

(71) Applicant: Facebook, Inc., Menlo Park, CA (US)

(72) Inventors: Marian Gelu Olteanu, New York, NY (US); Nilesh Nandan Dalvi, Sunnyale, CA (US); Manish Raghavan, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 178 days.

(21) Appl. No.: 14/144,175

(22) Filed: Dec. 30, 2013

(65) Prior Publication Data
US 2015/0186416 A1 Jul. 2, 2015

(51) Int. Cl.
*G06F 17/30* (2006.01)

(52) U.S. Cl.
CPC .... *G06F 17/30241* (2013.01); *G06F 17/3087* (2013.01)

(58) Field of Classification Search
CPC .................................................. G06F 17/30241
See application file for complete search history.

(56) References Cited

U.S. PATENT DOCUMENTS

| 2006/0212421 A1* | 9/2006 | Oyarce | G06F 17/30731 |
| 2010/0023259 A1* | 1/2010 | Krumm | G01C 21/20 701/532 |
| 2011/0022299 A1* | 1/2011 | Feng | G01C 21/20 701/533 |

* cited by examiner

*Primary Examiner* — Kris Andersen
(74) *Attorney, Agent, or Firm* — Fenwick & West LLP

(57) ABSTRACT

A social networking system generates a location store based on information received from its users. The location store includes entries having a physical location description and one or more terms associated with the physical location description. One or more entries associated with physical location descriptions within an area are identified. A local frequency of occurrence of each term in the identified entry is determined, and a global frequency of occurrence of each term in the identified entries within the location store is determined. Trending terms in the identified entries are determined based on the local frequencies and the global frequencies. Identified entries are compared to each other, with a score based on differing terms in compared entries and whether the differing terms are trending terms is generated. If a score is less than a threshold value, a combined entry is generated from the compared entries.

18 Claims, 5 Drawing Sheets

| Entry 410A | Guggenheim |
| --- | --- |
| Entry 410B | Guggenheim Museum |
| Entry 410C | Guggenheim Starbucks |
| Entry 410D | Starbucks Cafe |

| Descriptive Term 420A | Guggenheim |
| --- | --- |
| Descriptive Term 420B | Starbucks |

| Entry 610A | Starbucks, Menlo Park |
|---|---|
| Entry 610B | Starrbucks Café, M. Park, CA |
| Entry 610C | Peets, Menlo Park |

| Aligned Entry 620A | Starbucks, Menlo Park |
|---|---|
| Aligned Entry 620B | Starrbucks, M. Park |
| Aligned Entry 620C | Peets, Menlo Park |

| Combined Entry 630 | Starbucks, Menlo Park; Starrbucks, M. Park |
|---|---|
| Entry 610C | Peets, Menlo Park |

IDENTIFYING DESCRIPTIVE TERMS ASSOCIATED WITH A PHYSICAL LOCATION FROM A LOCATION STORE

BACKGROUND

This invention generally relates to social networking systems, and more particularly to maintaining a database of location information received from social networking system users.

A social networking system allows its users to connect to and communicate with other social networking system users. Users may create profiles on a social networking system that are tied to their identities and include information about the users, such as interests and demographic information. Additionally, users may provide a social networking system information specifying their current geographic locations or geographic locations they previously visited. This user location information may be presented to other social networking system users subject to user-specified privacy settings to enhance user interaction with the social networking system.

For example, a social networking system receives and stores information describing geographic locations from various users, creating a database of location information. To allow a user to more easily identify a geographic location, the social networking system allows a user to select information from the created database. Because users may use different terms to describe a physical location, various entries in the location database include terms providing different amounts of information about a physical location. However, because the information in the created database is provided by social networking system users, multiple entries in the database may differently refer to the same geographic location. This increases the complexity of a user selecting a geographic location by providing the user with different information associated with the geographic location.

SUMMARY

Users of a social networking system may provide the social networking system with information associated with a user's current location or associated with locations that the user has previously visited. Based on information associated with locations received from various users, the social networking system generates a location store including location information. Each entry in the location store includes a physical location description (e.g., latitude and longitude, city, state, etc.) and one or more terms associated with the physical location description. For example, terms associated with a physical location description include a descriptive name or other information associated with the physical location description.

To allow users to more easily identify physical locations from terms retrieved from the location store, the social networking system selects entries associated with a physical location description and determines a global frequency of each term in a selected entry. A term's global frequency is based on a number of occurrences of the term in the location store. From each of the selected entries, a candidate term is selected. In one embodiment, the candidate term selected from an entry is a term in the entry having a minimum global frequency relative to other terms in the entry. In other embodiments, other suitable criteria may be used to select a candidate term from each of the selected entries. Based at least in part on a frequency with which a candidate term occurs in the selected candidate terms, a measure of descriptiveness of the candidate term is determined. For example, the measure of descriptiveness of a candidate term is a number of occurrences of the candidate term in the selected candidate terms.

In one embodiment, descriptive terms associated with the physical location description are identified as candidate terms having a maximum measure of descriptiveness. Alternatively, the candidate terms are ranked based at least in part on their associated measures of descriptiveness and descriptive terms are identified as candidate terms with at least a threshold position in the ranking. Similarly, category terms associated with the physical location description are selected as candidate terms having a minimum measure of descriptiveness or having less than a threshold position in the ranking. The identified descriptive terms or category terms may be stored along with an association with the physical location description. In one embodiment, the descriptive terms are presented to a user when the physical location description is received. Alternatively, the category terms are not presented to a user when the physical location description is received.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
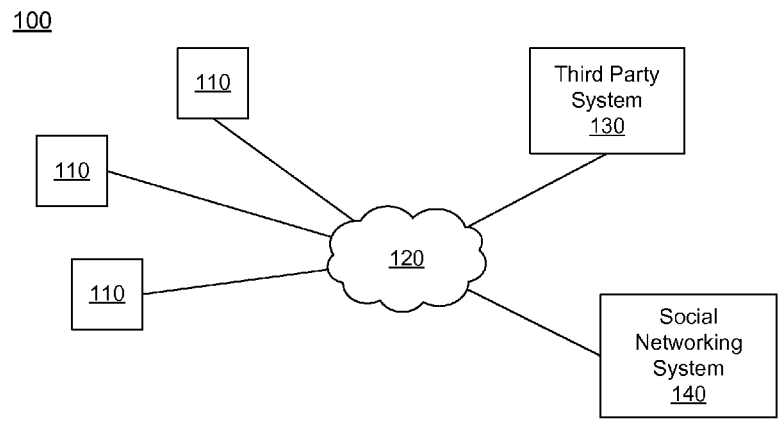
FIG. 1 is a block diagram of a system environment in which a social networking system operates, in accordance with an embodiment of the invention.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
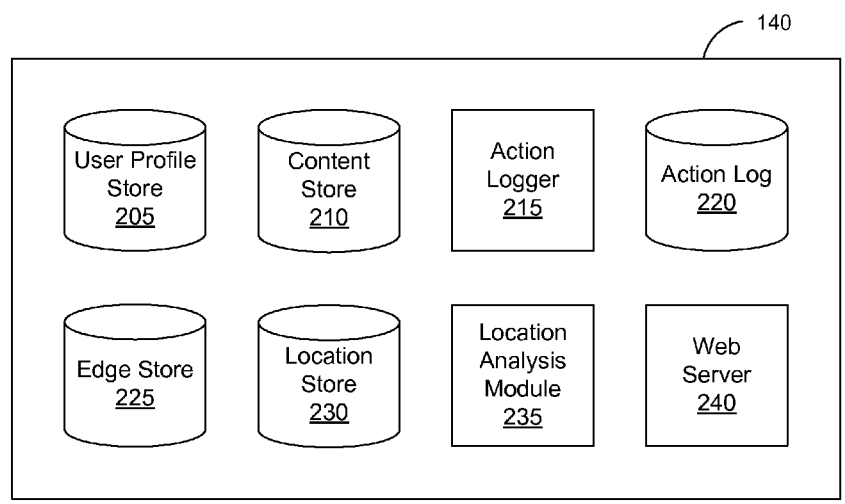
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, a location store 230, a location analysis module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The location store 230 includes entries describing locations based on information received from users of the social networking system 140. In one embodiment, each entry includes a physical location description and one or more terms associated with the physical location description. Examples of the physical location description include a latitude and longitude, a city, a state, a physical address, or other suitable information identifying a physical location. Terms included in an entry may include a descriptive name or other information associated with the physical location description. The terms in an entry of the location store 230 are received from user actions, such as check-in actions, content provided to the social networking system 140 and associated with a location by a user, or from other suitable user actions.

Because entries in the location store 230 are generated from user actions, multiple entries may be associated with a common physical location description. To allow users to more easily identify terms associated with a physical location from the location store 230, the location analysis module 235 analyzes entries in the location store 230 to combine entries associated with a common physical location description. Additionally, the location analysis module 235 identifies one or more descriptive terms associated with a physical location description based on terms included in entries of the location store 230 as further described below in conjunction with FIG. 3. Descriptive terms associated with a physical location description are terms from which a user has an increased likelihood of identifying the physical location description when presented with the descriptive terms.

As further described below in conjunction with FIG. 5, the location analysis module 235 identifies entries associated with a physical location description within an area and determines a global frequency with which each term in the identified entries appears in the location store 230. Additionally, the location analysis module 235 determines a local frequency with which each term in the identified entries appears in the identified entries. Based on the global frequencies and local frequencies associated with terms, the location analysis module 235 identifies trending terms from the identified entries, where a trending term has a local frequency exceeding its global frequency by a threshold amount. Terms in an identified entry and an additional identified entry are compared, and a score is generated for the identified entry based on the comparison, as further described below in conjunction with FIG. 5. If the score is less than a threshold value, the identified entry and the additional identified entry are combined to generate a combined entry.

The web server 240 links the social networking system 140 via the network 120 to the one or more client devices 110, as well as to the one or more third party systems 130. The web server 140 serves web pages, as well as other web-related content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Identifying Descriptive Terms Associated with a Physical Location Description

Figure 3:
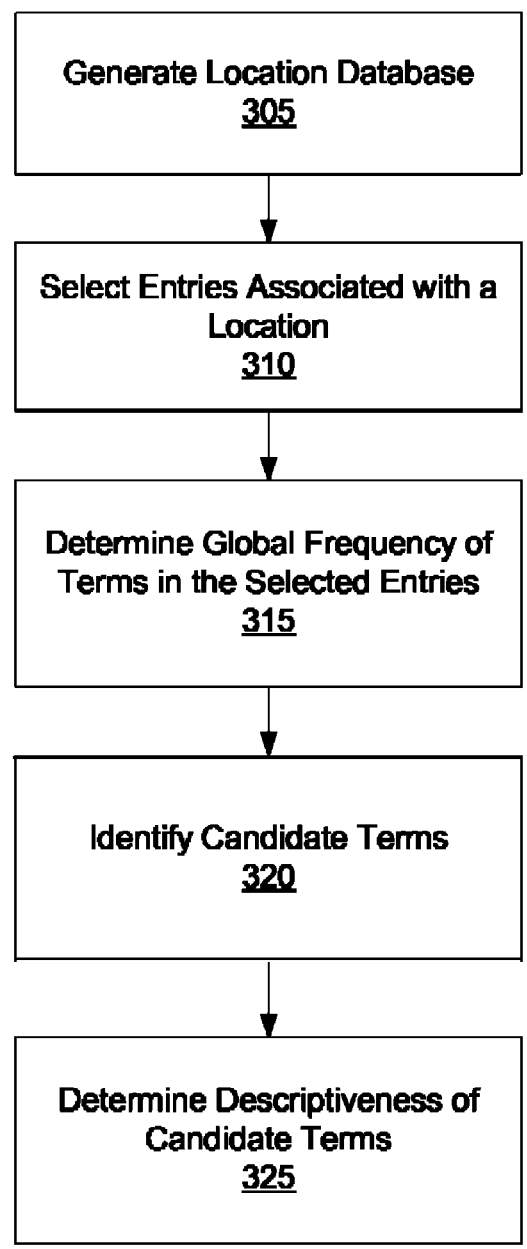
FIG. 3 is a flow chart of a method for identifying descriptive terms associated with one or more entries of a location store, according to one embodiment.

FIG. 3 is a flowchart of one embodiment of a method for identifying descriptive terms associated with a physical location from entries of a location store 230. As described above in conjunction with FIG. 2, the location store 230 is generated 305 based on information received from social networking system users. For example, entries in the location store 230 are generated 305 based on information from check-in actions by users, content provided by users, or other actions received from users are analyzed to generate 505 entries in the location store 230. An entry in the location store 230 includes a physical location description and one or more terms associated with the physical location description. The physical location description may be expressly provided by a user input, such as a check-in, or may be retrieved from a client device 110 associated with a user, subject to one or more privacy settings associated with the user and maintained by the social networking system 140, when the user provides data to the social networking system 140. For example, one or more terms are identified from a status update provided by a user to the social networking system 140, while a physical location description associated with the terms is determined by the social networking system 140 retrieving latitude and longitude coordinates, or other suitable information, from a client device 110 from which the status update was received, provided the user has authorized the social networking system 140 to retrieve information from the client device 110.

Because the location store 230 is generated 505 based on user-provided information, multiple entries each including different terms may be associated with a physical location description. Additionally, different users may provide terms that describe a physical location description with varying levels of description. To improve selection of information from the location store 230, the social networking system 140 analyzes entries associated with a physical location description to identify one or more terms from the entries providing a maximum amount of information associated with a physical location description. For example, the social networking system 140 identifies one or more descriptive terms associated with a physical location description from entries associated with a physical location description. The one or more descriptive terms provide information most closely associated with the physical location description, increasing a likelihood of a user identifying the physical location description when presented with the one or more descriptive terms.

To determine descriptive terms associated with a physical location description, the social networking system 140 selects 310 entries from the location store 230 associated with a physical location. In one embodiment, entries having a physical location matching a specified physical location description are selected 310. For example, entries in the location store 230 having a physical location description matching a specified physical location description of "Times Square, New York City" are selected 310.

The social networking system 140 determines 315 a global frequency associated with each term in the selected entries. A term's global frequency is based on a number of times the term occurs in all entries included in the location store 230. For example, the global frequency is a count of the number of occurrences of the term throughout the location store 230. Alternatively, a term's global frequency is a ratio of its number of occurrences throughout the location store 230 to a total number of terms in the location store 230; however, in other embodiments, a term's global frequency may be any suitable value based on a number of times the term occurs throughout the location store 230.

Candidate descriptive terms are identified 320 from the terms in the selected entries based at least in part on the determined global frequencies. In one embodiment, the social networking system 140 determines a global frequency of each term in a selected entry, and identifies 320 a candidate descriptive term from the selected entry as the term in the selected entry having a minimum global frequency. Hence, a candidate descriptive term is identified 320 from each selected entry as a term in a selected entry having a minimum global frequency. Typically, a term in an entry with a minimum global frequency more uniquely describes the characteristics or local context associated with a physical location associated with the entry. For example, words describing the functional aspects of a location such as "Museum," "Gallery," or "Arcade" typically have higher global frequencies. Conversely, terms more closely associated with a particular physical location have lower global frequencies; for example, terms such as "Guggenheim" or "Broadway," have a lower global frequency because they are associated with specific physical locations, making these terms better suited to identify particular physical locations.

For example, a selected entry associated with a physical location description of "Times Square, New York" includes the terms "Corbin Building Broadway," another selected entry includes the terms "Trinity Church Broadway," and an additional selected entry includes the terms "Starbucks Broadway." Based on global frequencies associated with each term in the selected entry including the terms "Corbin Building Broadway," "Broadway" has the lowest global frequencies in the selected entry and is identified 320 as a candidate descriptive term. Similarly, "Broadway" has the minimum global frequency of the terms in the selected entry including the terms "Starbucks Broadway," and is also identified 320 as a candidate descriptive term. In the selected entry including the terms "Trinity Church Broadway," the term "Trinity" has the minimum global frequency of terms in the selected entry, so "Trinity" is identified 320 as a candidate term. Accordingly, candidate terms identified 320 from these selected entries are "Broadway" and "Trinity."

Alternatively, rather than use global frequencies associated with terms to identify 320 candidate descriptive terms, weights are associated with each term based on the number of times a term occurs in the selected entries and a number of times the term occurs in the location store 230. For example, a weight associated with a term is a ratio of a number of times the term occurs in the selected entries to a number of times the term occurs in the location store 230. One or more candidate terms are identified 320 based on the weights associated with the terms. For example, terms associated with the lowest weights are identified 320 as candidate terms.

A measure of descriptiveness is determined 325 for each of the candidate terms. The measure of descriptiveness associated with a candidate term is a value describing how closely the candidate terms are associated with the physical location description. Various methods may be used to determine 325 the measure of descriptiveness for each candidate term. For example, a frequency at which each candidate term occurs in the candidate terms is determined. In the preceding example where the candidate terms "Broadway" and "Trinity" are identified, "Broadway" has a frequency of occurring in the candidate terms of 2, while "Trinity" has a frequency of occurrence in the candidate terms of 1. Candidate terms having a maximum frequency of occurrence in the candidate terms are identified as descriptive terms associated with the physical location description. Alternatively, candidate terms are ranked based at least in part on their frequency of occurrence in the candidate terms, and candidate terms having at least a threshold position in the ranking are identified as descriptive terms associated with the physical location description.

In another embodiment, category terms are identified based on the measures of descriptiveness of the candidate terms. Category terms may be terms that are associated with different physical location descriptions, so they provide a relatively small amount of information for identifying a physical location description. For example, candidate terms with the minimum frequency of occurrence in the candidate terms are identified as category terms. Alternatively, category terms are identified as candidate terms having less than at threshold position in a ranking of candidate terms based at least in part on their frequency of occurrence in the identified candidate terms.

The social networking system 140 may iteratively perform the above-described steps to more accurately identify descriptive terms or category terms. As an example, the social networking system 140 performs the above-described steps a specified number of times, and identifies descriptive terms associated with a physical location description after performing the steps the specified number of times. Alternatively, global frequencies associated with each candidate term are modified based on the measures of descriptiveness associated with the candidate terms, and an additional candidate term is selected from each selected entry. An additional candidate term is selected from a selected entry based on the modified global frequencies of terms in the entry previously identified as a candidate term and the global frequencies of terms in the entry not previously identified as a candidate term. For example, a global frequency associated with a term identified by a candidate term is divided by the measure of descriptiveness associated with the candidate term or is modified by another value based at least in part on the measure of descriptiveness associated with the candidate term. As described above, additional candidate terms are identified as a term in an entry having a minimum global frequency or modified global frequency. A measure of descriptiveness is then determined for each of the additional candidate terms as described above. Selection of additional candidate terms may be iterated until one or more conditions are satisfied. For example, global frequencies are modified and additional candidate terms are selected until the measures of descriptiveness determined for candidate terms and additional candidate terms is unchanged for a specified number of iterations.

Figure 4:
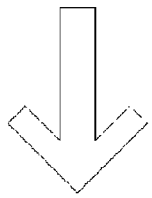
FIG. 4 is an example of identifying descriptive terms associated with a physical location, according to one embodiment.

FIG. 4 is an example of identifying descriptive terms associated with a physical location. In the example of FIG. 4, entries 410A, 410B, 410C, 410D associated with a physical location description are selected. Entry 410A includes the term "Guggenheim," while entry 410B includes the terms "Guggenheim" and "Museum." Additionally, entry 410C includes the terms "Guggenheim" and "Starbucks," while entry 410D includes the terms "Starbucks" and "Café." As described above in conjunction with FIG. 3, the global frequency of each term in the entries 410A, 410B, 410C, 410D is determined, and a term from each entry 410 having a minimum global frequency relative to other terms in the entry 410 is identified as a candidate term.

In the example of FIG. 4, the term "Guggenheim" has the minimum global frequency from the terms in entry 410A and is identified as a candidate term. Similarly, the term "Guggenheim" also has the minimum global frequency of terms in entry 410B as well as in entry 410C, and is identified as a candidate term associated with entry 410B and entry 410C. In entry 410D, "Starbucks" has the minimum global frequency of the terms in entry 410D, so "Starbucks" is identified as a candidate term associated with entry 410D.

The frequency of each candidate term among the identified candidate terms is determined. Terms having at a high, or at least a threshold, frequency amongst the identified candidate terms are terms that are most descriptive of the physical locations associated with the entries 410A, 410B, 410C and 410D. In the example of FIG. 4, "Guggenheim" appears 3 times in the identified candidate terms, while "Starbucks" appears a single time in the identified candidate terms. Accordingly, "Guggenheim" and "Starbucks" are identified as descriptive terms 420A, 420B associated with the physical location associated with the entries 410A, 410B, 410C, 410D. In one embodiment, the descriptive terms 420A, 420B are stored in the location store 230 and associated with a physical location description associated with the entries 410A, 410B, 410C, 410D.

Generating a Combined Entry Associated with a Physical Location Description

Figure 5:
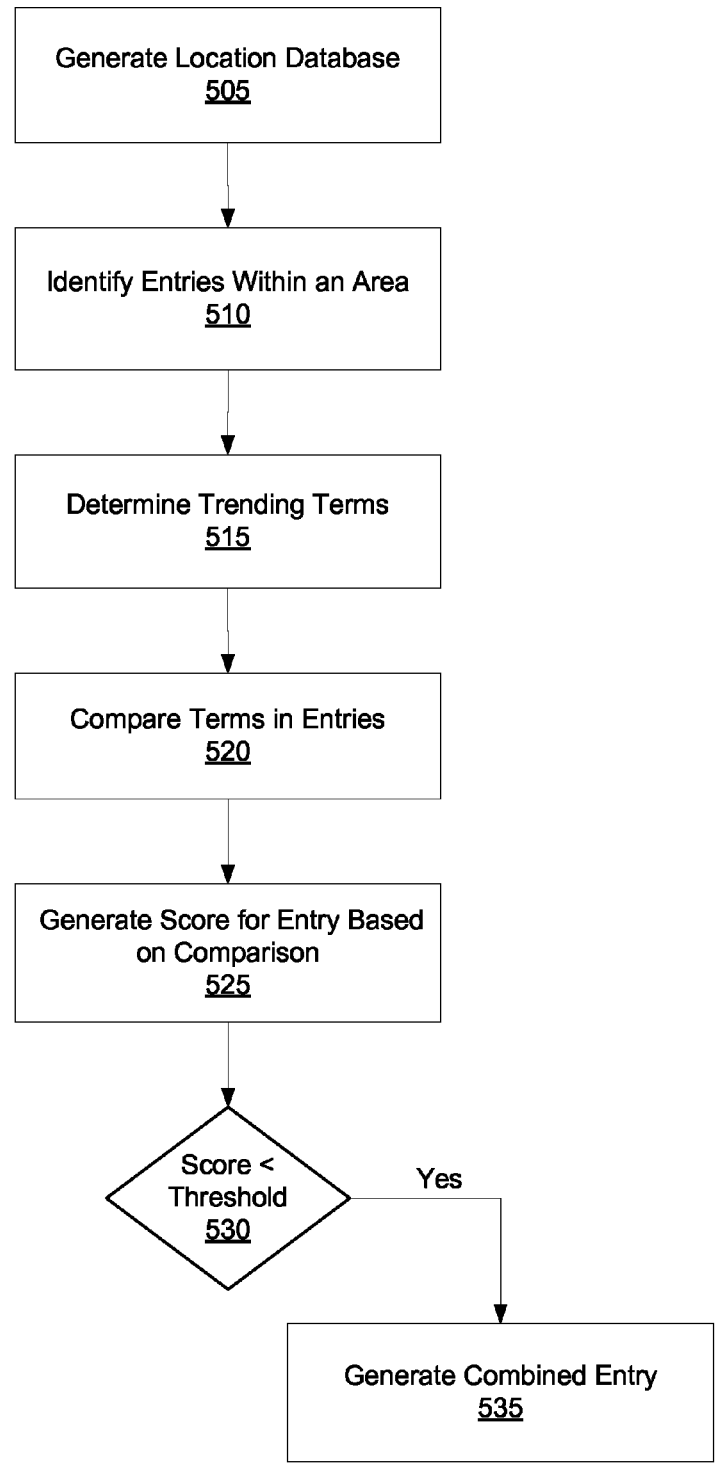
FIG. 5 is a flow chart of a method for combining entries in a location store, according to one embodiment.

FIG. 5 is a flow chart of one embodiment of a method for identifying duplicate entries of the location store 230. As described above in conjunction with FIG. 2, the location store 230 is generated 505 based on information received from social networking system users. For example, information from check-in actions by users, content provided by users, or other actions received from users is analyzed to generate 505 entries in the location store 230. As described above in conjunction with FIG. 2, an entry in the location store 230 includes a physical location description and one or more terms associated with the physical location description. Because entries in the location store 230 are generated from user actions and multiple users may associate different terms with a physical location description, resulting in multiple entries of the location store 230 being associated with a common physical location description.

To identify duplicate entries in the location store 230 associated with a physical location description, entries in the location store 230 associated with a physical location description within an area are identified 510. In one embodiment, entries having a physical location description within a threshold distance of a specified physical location are identified 510. For example, entries in the location store 230 having a physical location description within a threshold distance of "Times Square, New York City" are identified 510.

One or more trending terms in the identified entries are determined 515 based on a global frequency of each term in the identified entries within the location store 230 in its entirety and a local frequency of each term in the identified entries within the identified entries. A trending term is a term having a local frequency exceeding its global frequency by at least a threshold amount; hence, a trending term is a term having a threshold popularity relative to the identified area. For example, if the terms "Times" and "Square" appear more frequently in entries having physical locations within an area than in the location store 230 as a whole, the terms "Times" and "Square" are determined 515 to be trending terms for the area.

In one embodiment, a ratio of a term's local frequency to its global frequency is used to determine 515 if the term is a trending term. Hence, the term's global frequency is determined based on the number of times the term occurs in all entries in the location store 230, and the term's local frequency is determined based on the number of times the term occurs in entries identified 510 as associated with physical location descriptions within the area. For example, a database of terms included in entries of the location store 230 is maintained that associates a number of occurrences in the location store 230 with a term; the number of occurrences associated with a term is incremented each time a new entry in the location store 230 includes the term. Similarly, a term is identified from the identified entries within the area and a number of entries in the identified entries including the identified term are computed to determine the local frequency of the term.

Based on a local frequency of a term and a global frequency associated with a term in the identified entries, the social networking system 140 determines 515 if the term is a trending term. For example, a ratio of the local frequency of a term to the global frequency of the term is determined, and the term is determined 515 to be a trending term if the ratio has at least a threshold value. Alternatively, a distribution describing a frequency of one or more terms across entries in the location store 230 associated with physical descriptions of locations within different areas is determined, and a trending term associated with the area is determined 515 as terms having at least a threshold frequency of occurrence in the area. For example, a distribution indicates that the term "Menlo Park" is a trending term among entries in the location store 230 having a physical location description within a threshold distance from San Francisco, Calif.

After determining trending terms in the entries associated with physical location descriptions within the area, an identified entry is compared 520 to another identified entry, referred to herein as an "additional identified entry." Terms in the identified entry are identified and compared to terms in the additional identified entry. In one example, string alignment is used to align terms within the identified entry and terms within the additional identified entry, and the terms in the identified entry are compared to the terms in the additional identified entry after alignment. For example, the identified entry includes the terms "Coffee Shop A" and "Downtown NYC" and the additional identified entry includes the terms "Coffee A" and "Downtown New York." In one embodiment, these example entries may be aligned by deleting the term "Shop" from the identified entry.

In one embodiment, weights are associated with terms in the identified entry and in the additional identified entry based on the local frequencies and/or global frequencies associated with the terms. For example, a weight associated with a term is based on the local or global frequency associated with the term. Alternatively, a weight is associated with a term based on the global frequency of the term, and the weight is modified to a value based on a local frequency of the term associated with the term when the term is included in entries of the location store 230 having a physical location description within an area. For example, when an entry including the terms "New," "York," and "City" has a physical location description within a threshold distance of a physical location, the weights associated with "New," "York," and "City" are based on the local frequencies associated with each of the terms.

In another embodiment, candidate terms are identified from the identified entries within the area and a measure of descriptiveness is determined for each candidate term as discussed in conjunction with FIG. 3. For example, a frequency with which each candidate term occurs in the candidate terms is determined, and a candidate term is identified as a descriptive term or as a category term based on the frequency with which the candidate term occurs in the candidate terms, as described above in conjunction with FIG. 3. A weight may be associated with a term in an in the identified entry based on whether the term is identified as a descriptive term or is identified as a category term; alternatively a weight associated with a term in an identified entry is based on a measure of descriptiveness associated with the term.

An identified entry and an additional identified entry are selected, and terms in the identified entry are compared 520 to terms in the additional identified entry. In one embodiment, terms in the identified entry are aligned with terms in the additional identified entry, and the aligned terms are compared 520 to identify differences. An addition or deletion based metric may be used to determine costs of differences between two aligned terms. For example, while comparing the terms "coffee" and "coffeeAB," the cost associated with the difference between the two terms is 2 based on removing the letters "A" and "B" from the second term. In one embodiment, the cost is discounted based on a factor if the term is a trending term; for example, the cost of a difference between terms may be discounted by a factor based at least in part on a ratio of the term's local frequency to the term's global frequency if the term is identified as a trending term. Alternatively, weights associated with each term based at least in part on the global frequency and local frequency of a term are used to determine the cost of a difference between a term in the identified entry and a term in the additional identified entry. For example the cost of a difference between a term in the identified entry and a term in the additional identified entry is based on its value and the number of differences between characters in a term (e.g., a cost is a product of the weight of the term in the identified entry and the number of differences between the term in the identified entry and the term in the additional identified entry). In other examples, the costs of differences between terms in an identified entry and terms in an additional identified entry may be determined in other suitable methods based on the weights associated with the terms in each entry and differences between the terms.

The costs of differences between terms in the identified entry and in the additional identified entry are combined to generate 525 a score representing a similarity between the identified entry and the additional identified entry. For example, the costs are summed to generate 525 the score, although any suitable method may be used to generate 525 the score from the costs. In one embodiment, the social networking system 140 determines 530 if the score is less than a threshold value. If the score is less than the threshold value, the social networking system generates 535 a combined entry associated with the same physical location description in the identified entry and in the additional identified entry and including terms from the identified entry and from the additional identified entry. The threshold value may be specified using any suitable method. If the score is not less than the threshold value, the identified entry and the additional identified entry are maintained as separate entities in the location store 230. In other embodiments, different methods such as machine learning may be used to determine whether to generate a combined entry from an identified entry and an additional identified entry. For example, different spellings of the same term may be learned over time to identify similar terms for generating a combined entry. The preceding steps may be repeated for various combinations of identified entries to reduce the number of entries in the location store 230 associated with physical location descriptions within the area.

Figure 6:
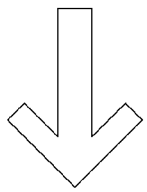
FIG. 6 is an example of combining entries of a location store, according to one embodiment.
Figure 6:
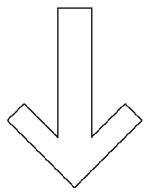

FIG. 6 is an example of combining entries of the location store 230. In FIG. 6, entries 610A, 610B, 610C are identified from the location store 230 as entries including physical location descriptions within an area. For purposes of illustration, entry 610A includes the terms "Starbucks," and "Menlo Park;" entry 610B includes the terms "Starrbucks Café," "M. Park" and "CA," while entry 610C includes the terms "Peets," "Menlo Park." In the example of FIG. 6, based on the global frequencies and local frequencies associated with the various terms, "Menlo," "Park," and "CA" are identified as trending terms.

The terms in each of the entries 610A, 610B, 610C are aligned to generate aligned entries 620A, 620B, 620C. Aligned entry 620A includes the terms "Starbucks" and "Menlo Park." Aligned entry 620B is generated by removing the terms "Café" and "CA" from entry 610B, resulting in aligned entry 620B including the terms "Starrbucks" and "M. Park." Additionally, aligned entry 620C includes the terms "Peets" and "Menlo Park." Terms in various aligned terms 620 are compared to each other to generate scores associated with comparisons of different pairs of aligned terms 620. For example, when comparing aligned entry 620A to aligned entry 620B, costs associated with the differences between "Starbucks" and "Starrbucks" and "Menlo" and "M." are determined. In one embodiment, 1 deletion is identified as the difference between "Starbucks" and "Starrbucks," while 4 deletions and one insertion are identified as the differences between "Menlo" and "M." Because "Menlo" is identified as a trending term, the costs associated with the differences between "Menlo" and "M." are attenuated or discounted. Additionally, the inclusion of the term "CA" in aligned entity 620B and not in aligned entry 620A is also discounted because "CA" is also identified as a trending term. The single deletion between "Starbucks" and "Starrbucks" results in a small cost associated with the difference, while the inclusion of "Café" in aligned entry 620B and not in aligned entry 612A results in another cost. By combining the costs, a score associated with the comparison of aligned entry 620A and aligned entry 620B is generated. In the example of FIG. 6, the score is less than a threshold value, so a combined entry 630 is generated that includes the terms from entry 610A and from entry 610B.

As another example, terms in aligned entry 620A are compared to terms in aligned entry 630C. In this example, the terms "Menlo" and "Park" appear in aligned entry 620A and aligned entry 620C, so there is no cost, or a negligible cost, associated with these terms. However, there are 14 differences between the terms "Starbucks" and "Peets" in aligned entry 620A and in aligned entry 620C based on additions and deletions. Based on the cost associated with these differences, a score is determined. In the example of FIG. 6, the score is greater than the threshold value, so entry 610C, which corresponds to aligned entry 620C, is not combined with entry 610A.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
generating a location store comprising a plurality of entries maintained by a social networking system, each entry including a physical location description and one or more terms associated with the physical location description;
selecting entries from the plurality of entries associated with a physical location;
determining a global frequency of each term in an entry from the selected entries, the global frequency of each term in the entry based at least in part on a number of occurrences of the term in all of the entries of the location store;
identifying candidate descriptive terms by identifying a candidate descriptive term associated with each of the selected entries, the candidate descriptive term associated with each of the selected entries being a term in an entry having a minimum global frequency of the one or more terms in the entry;
determining a frequency that a first candidate descriptive term occurs in the candidate descriptive terms;
modifying the global frequency of the first candidate descriptive term by the frequency of the first candidate descriptive term to obtain a modified global frequency for the first candidate descriptive term in the entry;
identifying additional candidate descriptive terms, wherein the identifying comprises:
identifying a second candidate descriptive term having a minimum modified global frequency of the one or more terms in an entry from the selected entries as an additional candidate descriptive term, and
determining whether a frequency of occurrence of the additional candidate descriptive term has changed in a current iteration in comparison to a preceding iteration;
responsive to determining that the frequency of occurrence of the additional candidate descriptive term is unchanged, identifying the additional candidate descriptive term as a descriptive term associated with the physical location description;
receiving a physical location description from a client device;
retrieving, from the location store, a plurality of entries for the physical location description; and
providing for display, from the plurality of retrieved entries, one or more entries to the client device for presentation to a user of the client device, wherein the one or more entries being presented on the client device are based on the additional candidate descriptive term associated with the physical location description.

2. The computer-implemented method of claim 1, wherein identifying the additional candidate descriptive term as a descriptive term associated with the physical location comprises:
identifying a candidate descriptive term having a maximum frequency of occurrence in the candidate descriptive terms.

3. The computer-implemented method of claim 1, wherein identifying the additional candidate descriptive term as a descriptive term associated with the physical location comprises:
ranking the candidate descriptive terms based at least in part on frequencies that each candidate descriptive term occurs in the candidate descriptive terms; and
selecting one or more candidate descriptive terms having at least a threshold position in the ranking as the one or more descriptive terms.

4. The computer-implemented method of claim 1, wherein identifying the candidate descriptive term associated with each of the selected entries comprises:
associating a weight with a term in an entry from the selected entries based on a number of occurrences of the term from the entry in the selected entries and the global frequency of the term; and
identifying the candidate descriptive term associated with the entry based at least in part on the weight associated with the term in the entry from the selected entries.

5. The computer-implemented method of claim 1, further comprising:
storing the one or more descriptive terms and an association between the one or more descriptive terms and the physical location.

6. The computer-implemented method of claim 1, wherein identifying one or more descriptive terms associated with the physical location based at least in part on frequencies with which each additional candidate descriptive term occurs in the additional candidate descriptive terms comprises:
ranking the additional candidate descriptive terms based at least in part on the frequencies with which each additional candidate descriptive term in the identified additional candidate descriptive terms occurs in the additional candidate descriptive terms; and
selecting one or more additional candidate descriptive terms having at least a threshold position in the ranking as the one or more descriptive terms.

7. A computer-implemented method comprising:
selecting entries from a location store associated with a physical location within an area, wherein each entry from the location store includes a physical location description and one or more terms associated with the physical location description;
identifying candidate descriptive terms by identifying a candidate descriptive term from each of the selected entries, the candidate descriptive term from each of the selected entries being a term in an entry having a minimum global frequency of the one or more terms in the entry;
determining a frequency that a first candidate descriptive term occurs in the candidate descriptive terms;
modifying the global frequency of the first candidate descriptive term by the frequency of the first candidate descriptive term to obtain a modified global frequency for the first candidate descriptive term in the entry;
identifying additional candidate descriptive terms, wherein the identifying comprises:
identifying a second candidate descriptive term having a minimum modified global frequency of the one or more terms in an entry from the selected entries as an additional candidate descriptive term, and
determining whether a frequency of occurrence of the additional candidate descriptive term has changed in a current iteration in comparison to a preceding iteration;
responsive to determining that the frequency of occurrence of the additional candidate descriptive term is unchanged, identifying the additional candidate descriptive term as a descriptive term associated with the physical location description;

receiving a physical location description from a client device;

retrieving, from the location store, a plurality of entries for the physical location description; and providing for display, from the plurality of retrieved entries, one or more entries to the client device for presentation to a user of the client device, wherein the one or more entries being presented on the client device are based on the additional candidate descriptive term associated with the physical location description.

8. The computer-implemented method of claim 7 further comprising:

identifying a term having a minimum frequency of occurrence in the candidate descriptive terms as a category term associated with the physical location; and withholding the category term from being presented to the user on the client device.

9. The computer-implemented method of claim 7, wherein identifying the additional candidate descriptive term as a descriptive term associated with the physical location comprises:

ranking the candidate descriptive terms based at least in part on frequencies that each candidate descriptive occurs in the candidate descriptive terms; and selecting one or more candidate descriptive terms having at least a threshold position in the ranking as the one or more descriptive terms.

10. The computer-implemented method of claim 7, wherein identifying the additional candidate descriptive term as a descriptive term associated with the physical location comprises:

identifying a candidate descriptive term having a maximum frequency of occurrence in the candidate descriptive terms.

11. The computer-implemented method of claim 7, wherein identifying the additional candidate descriptive term as a descriptive term associated with the physical location comprises:

ranking the candidate descriptive terms based at least in part on frequencies that each candidate descriptive term occurs in the candidate descriptive term; and selecting one or more candidate descriptive terms having at least a threshold position in the ranking as category terms associated with the physical location.

12. The computer-implemented method of claim 7, wherein identifying the candidate descriptive term from each of the selected entries comprises:

associating a weight with a term in an entry from the selected entries based on a number of occurrences of the term from the entry in the selected entries and the global frequency of the term; and identifying the candidate descriptive term associated with the entry based at least in part on the weight associated with the term in the entry from the selected entries.

13. The computer-implemented method of claim 7, further comprising:

storing the one or more terms and an association between the one or more terms and the physical location.

14. A computer program product comprising a non-transitory computer-readable storage medium including instructions that, when executed by a processor, cause the processor to perform steps including:

generating a location store comprising a plurality of entries maintained by a social networking system, each entry including a physical location description and one or more terms associated with the physical location description;

selecting entries from the plurality of entries associated with a physical location;

determining a global frequency of each term in an entry from the selected entries, the global frequency of each term in the entry based at least in part on a number of occurrences of the term in all of the entries of the location store;

identifying candidate descriptive terms by identifying a candidate descriptive term associated with each of the selected entries, the candidate descriptive term associated with each of the selected entries being a term in an entry having a minimum global frequency of the one or more terms in the entry;

determining a frequency that a first candidate descriptive term occurs in the candidate descriptive terms;

modifying the global frequency of first candidate descriptive term by the frequency of first candidate descriptive term to obtain a modified global frequency for the first candidate descriptive term in the entry:

identifying additional candidate descriptive terms, wherein the identifying comprises:

identifying a second candidate descriptive term having a minimum modified global frequency of the one or more terms in an entry from the selected entries as an additional candidate descriptive term, and determining whether a frequency of occurrence of the additional candidate descriptive term has changed in a current iteration in comparison to a preceding iteration;

responsive to determining that the frequency of occurrence of the additional candidate descriptive term is unchanged, identifying one or more the additional candidate descriptive term as a descriptive term associated with the physical location description;

receiving a physical location description from a client device;

retrieving, from the location store, a plurality of entries for the physical location description; and providing for display, from the plurality of retrieved entries, one or more entries to the client device for presentation to a user of the client device, wherein the one or more entries being presented on the client device are based on the additional candidate descriptive term associated with the physical location description.

15. The computer program product of claim 14, wherein identifying the additional candidate descriptive term as a descriptive term associated with the physical location comprises:

identifying a candidate descriptive term having a maximum frequency of occurrence in the candidate descriptive terms.

16. The computer program product of claim 14, wherein identifying the additional candidate descriptive terms associated with the physical location comprises:

ranking the candidate descriptive terms based at least in part on frequencies that each candidate descriptive term occurs in the candidate descriptive terms; and selecting one or more candidate descriptive terms having at least a threshold position in the ranking as the one or more descriptive terms.

17. The computer program product of claim 14, wherein identifying the candidate descriptive term associated with each of the selected plurality of entries comprises:

associating a weight with each a term in an entry from the plurality of selected entries based on a number of occurrences of the term from the entry in the selected entries and the global frequency of the term; and identifying the candidate descriptive term associated with the entry based at least in part on the weight associated with the term in the entry from the selected entries.

18. The computer program product of claim 14, wherein the non-transitory computer readable storage medium further includes instructions that, when executed by the processor, cause the processor to perform the steps including:

storing the one or more descriptive terms and an association between the one or more descriptive terms and the physical location.

* * * * *

UNITED STATES PATENT AND TRADEMARK OFFICE
CERTIFICATE OF CORRECTION

| | |
|---|---|
| PATENT NO. | : 9,613,054 B2 |
| APPLICATION NO. | : 14/144175 |
| DATED | : April 4, 2017 |
| INVENTOR(S) | : Marian Gelu Olteanu, Nilesh Nandan Dalvi and Manish Raghavan |

It is certified that error appears in the above-identified patent and that said Letters Patent is hereby corrected as shown below:

In the Claims

Column 17, Line(s): 23, Claim 9:
"that each candidate descriptive"
Should read as:
– that each candidate descriptive term –

Column 18, Line(s): 32, Claim 14:
"identifying one or more the"
Should read as:
– identifying one or more of the –

Column 18, Line(s): 64, Claim 17:
"with each a term"
Should read as:
– with each term –

Signed and Sealed this
Twenty-fourth Day of October, 2017

Joseph Matal
*Performing the Functions and Duties of the
Under Secretary of Commerce for Intellectual Property and
Director of the United States Patent and Trademark Office*